US012645132B2

(12) United States Patent (10) Patent No.: US 12,645,132 B2
Kim et al. (45) Date of Patent: Jun. 2, 2026

(54) CAMERA MODULE

(71) Applicant: SAMSUNG ELECTRO-MECHANICS CO., LTD., Suwon-si (KR)

(72) Inventors: Su Kyeong Kim, Suwon-si (KR); Bo Sung Seo, Suwon-si (KR); Nam Ki Park, Suwon-si (KR); Soo Cheol Lim, Suwon-si (KR); Je Ho Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 248 days.

(21) Appl. No.: 18/456,125

(22) Filed: Aug. 25, 2023

(65) Prior Publication Data

US 2024/0319568 A1 Sep. 26, 2024

(30) Foreign Application Priority Data

Mar. 23, 2023 (KR) ........................ 10-2023-0037732

(51) Int. Cl.
  H04N 23/55 (2023.01)
  G02B 7/02 (2021.01)
  (Continued)

(52) U.S. Cl.
  CPC .............. G03B 17/12 (2013.01); G02B 7/02 (2013.01); H04N 23/55 (2023.01); G03B 5/00 (2013.01);
  (Continued)

(58) Field of Classification Search
  USPC ........................................................ 396/529
  See application file for complete search history.

(56) References Cited

U.S. PATENT DOCUMENTS

| 7,574,125 B2 * | 8/2009 | Ho | ........................ G02B 7/102 |
| | | | 396/85 |
| 7,973,855 B2 * | 7/2011 | Shirono | ............... H04N 23/687 |
| | | | 348/208.7 |
| 10,444,530 B2 * | 10/2019 | Park | ...................... H04N 23/57 |

(Continued)

FOREIGN PATENT DOCUMENTS

| KR | 10-2015-0026009 A | 3/2015 |
| KR | 10-1725442 B1 | 4/2017 |

(Continued)

OTHER PUBLICATIONS

Korean Office Action issued on May 15, 2025, in corresponding Korean Patent Application No. 10-2023-0037732. (7 pages in English, 6 pages in Korean).

*Primary Examiner* — Christopher E Mahoney
*Assistant Examiner* — Warren K Fenwick
(74) *Attorney, Agent, or Firm* — NSIP Law

(57) ABSTRACT

A camera module includes a housing having an internal space; a carrier disposed in the internal space; a lens module provided in the carrier; and a first ball member and a second ball member, disposed between the carrier and the housing and spaced apart in a direction, perpendicular to an optical axis, wherein a virtual line connecting a center of a ball included in the first ball member and a center of a ball included in the second ball member passes through the lens module, wherein the lens module includes a first avoidance portion securing space in which at least one of the first ball member or the second ball member is disposed.

20 Claims, 9 Drawing Sheets

(51) Int. Cl.
    *G03B 17/12*           (2021.01)
    *G03B 5/00*            (2021.01)
    *G03B 13/36*          (2021.01)

(52) U.S. Cl.
    CPC ...... *G03B 13/36* (2013.01); *G03B 2205/0069*
                                 (2013.01)

(56)            References Cited

U.S. PATENT DOCUMENTS

| | | | |
|---|---|---|---|
| 10,634,867 B2 * | 4/2020 | Lim | G02B 7/08 |
| 10,859,847 B2 * | 12/2020 | Rhee | G02B 7/021 |
| 11,209,663 B2 * | 12/2021 | Park | G02B 7/08 |
| 11,409,073 B2 * | 8/2022 | Lee | G02B 7/1805 |
| 11,726,297 B2 * | 8/2023 | Smirnov | G03B 3/10 |
| | | | 396/55 |
| 12,058,429 B2 * | 8/2024 | Lim | G02B 1/118 |
| 12,099,283 B2 * | 9/2024 | Lim | H04N 23/57 |
| 2015/0256727 A1 * | 9/2015 | Kim | G03B 5/04 |
| | | | 348/208.12 |
| 2017/0139225 A1 | 5/2017 | Lim | |
| 2020/0050084 A1 * | 2/2020 | Lim | G02B 7/04 |
| 2021/0173226 A1 * | 6/2021 | Lee | G03B 30/00 |
| 2021/0215902 A1 * | 7/2021 | Lim | G02B 27/646 |
| 2022/0103725 A1 * | 3/2022 | Lee | H04N 23/51 |
| 2022/0103731 A1 * | 3/2022 | Park | G02B 7/09 |

FOREIGN PATENT DOCUMENTS

| | | |
|---|---|---|
| KR | 10-2017-0138672 A | 12/2017 |
| KR | 10-2020-0017763 A | 2/2020 |
| KR | 10-2140296 B1 | 7/2020 |
| KR | 10-2022-0110156 A | 8/2022 |

* cited by examiner

1

I

200

130

Z

X

Y

I'

CAMERA MODULE

CROSS-REFERENCE TO RELATED APPLICATIONS

This application claims the benefit under 35 USC 119(a) of Korean Patent Application No. 10-2023-0037732 filed on Mar. 23, 2023, in the Korean Intellectual Property Office, the entire disclosure of which is incorporated herein by reference for all purposes.

BACKGROUND

1. Field

The present disclosure relates to a camera module.

2. Description of the Background

A camera module may be employed in a mobile communication terminal such as a smartphone, a tablet PC, a laptop computer, or the like.

In addition, in order to generate a high-resolution image, the camera module may be provided with an actuator having a focus adjusting function.

For example, the actuator having the focus adjusting function may include a magnet and a coil, generating driving force, and may further include a plurality of ball members supporting movement of a lens module in an optical axis direction.

In order to improve focus adjustment performance, the lens module should be moved parallel to the optical axis direction (i.e., such that no tilt occurs).

However, when the movement of the lens module in the optical axis direction is supported by the plurality of ball members, tilt may occur while the lens module moves.

For example, there may be a problem in that the lens module may be tilted during focus adjustment, which may adversely affect focus adjustment performance.

In addition, there may be a problem in that a shake compensation actuator provided in the camera module may also be affected by occurrence of a focus adjusting actuator being tilted.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a camera module includes a housing having an internal space, a carrier disposed in the internal space, a lens module provided in the carrier, and a first ball member and a second ball member, disposed between the carrier and the housing and spaced apart in a direction, perpendicular to an optical axis, wherein a virtual line connecting a center of a ball included in the first ball member and a center of a ball included in the second ball member passes through the lens module, and wherein the lens module includes a first avoidance portion securing space in which the first ball member or the second ball member is disposed.

The carrier may be provided with a substantially quadrilateral shape, and the first ball member and the second ball member may be provided on a corner of the carrier to be spaced apart in a diagonal direction.

The lens module may include a lens holder having a substantially quadrilateral shape, the camera module may further include a guide frame having a substantially quadrilateral shape, provided between the carrier and the lens module in an optical axis direction, the first avoidance portion may be provided on any one corner of the lens holder, and the guide frame may include a second avoidance portion overlapping the first avoidance portion in the optical axis direction.

The lens module may have an edge provided with a substantially quadrilateral shape, and the first avoidance portion may be provided to have a cut shape in a position overlapping the first ball member or the second ball member in an optical axis direction.

The lens module may include a lens barrel having at least one lens therein, and a lens holder coupled to the lens barrel, and the first avoidance portion may be provided in the lens holder.

The camera module may further include a guide frame provided between the carrier and the lens module in an optical axis direction, wherein the guide frame may include a second avoidance portion in a position overlapping the first avoidance portion in the optical axis direction.

A space formed by the first avoidance portion and a space formed by the second avoidance portion such that the first ball member or the second ball member may be disposed therein may be provided to overlap in the optical axis direction.

The first avoidance portion may be provided to have a shape in which a corner of the lens holder may be cut, and the second avoidance portion may be provided to have a shape in which a corner of the guide frame may be cut.

In a state in which the carrier and the lens module are coupled to each other, at least one of the first ball member and the second ball member may be exposed to be upwardly visible in an optical axis direction.

The first ball member and the second ball member may be disposed in a guide groove portion formed on an external surface of the carrier, respectively.

The first avoidance portion may be provided to correspond to a position in which the guide groove portion may be formed in the carrier.

An electronic device may include the camera module, and an image sensor configured to convert light incident through the lens module into an electrical signal.

In another general aspect, a camera module includes a housing having an internal space, a carrier accommodated in the internal space, a lens holder accommodated in the carrier, a lens barrel coupled to the lens holder, and a first ball member and a second ball member, disposed between the carrier and the housing and spaced apart in a direction, perpendicular to an optical axis, wherein a length of a virtual line connecting a center of a ball included in the first ball member and a center of a ball included in the second ball member is greater than a maximum diameter of the lens barrel, the lens holder has a substantially quadrilateral shape with four edges, and at least a portion of the second ball member is located in an internal space of a virtual corner formed by a virtual intersection point at which virtual lines extending from two edges of the lens holder adjacent to the second ball member meet.

The virtual corner may be a first avoidance portion in which a corner of the lens holder may be cut.

The camera module may further include a guide frame provided between the carrier and the lens holder in the optical axis direction, wherein the guide frame may have a second avoidance portion in a position overlapping the first avoidance portion in an optical axis direction.

In another general aspect, a camera module includes a housing having an internal space, a carrier having a substantially quadrilateral shape and disposed in the internal space, and a lens module disposed in the carrier, wherein the carrier is configured to move in an optical axis direction on support ball members disposed between the carrier and the housing, wherein closest support ball members are disposed on a same diagonal of the substantially quadrilateral shape, wherein each support ball member comprises one or more balls, and wherein the lens module comprises a first avoidance portion securing space in which a support ball member is disposed.

The lens module may include a lens barrel and a lens holder, and the support ball members may include a first ball member and a second ball member disposed on opposite sides of the lens barrel from each other.

The camera module may further include a magnet disposed on one of the carrier and the housing and a coil disposed on the other of the carrier and the housing to drive the carrier in the optical axis direction, wherein the first ball member may be disposed closer to the magnet than the second ball member.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
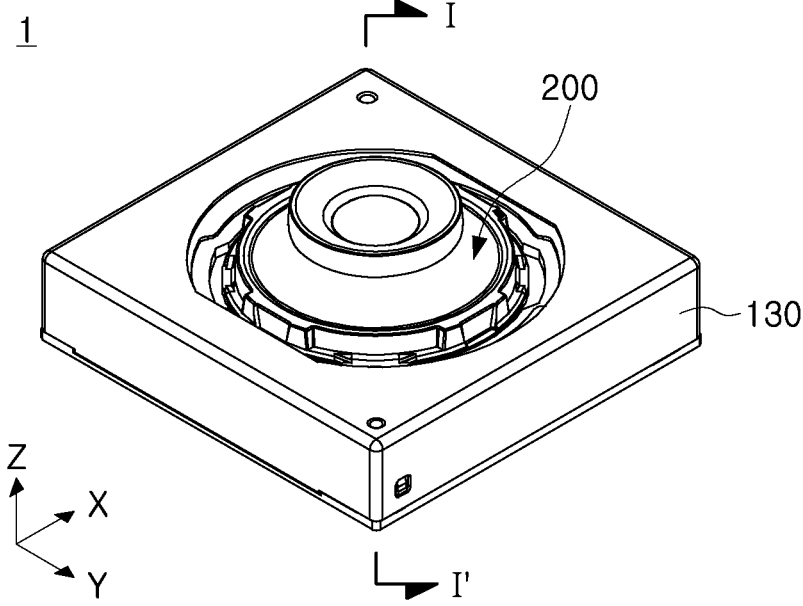
FIG. 1 is a perspective view of a camera module according to an embodiment of the present disclosure.

Hereinafter, while examples of the present disclosure will be described in detail with reference to the accompanying drawings, it is noted that examples are not limited to the same.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms, such as "above," "upper," "below," "lower," and the like, may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above," or "upper" relative to another element would then be "below," or "lower" relative to the other element. Thus, the term "above" encompasses both the above and below orientations depending on the spatial orientation of the device. The device may also be oriented in other ways (rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

Herein, it is noted that use of the term "may" with respect to an example, for example, as to what an example may include or implement, means that at least one example exists in which such a feature is included or implemented while all examples are not limited thereto.

The features of the examples described herein may be combined in various ways as will be apparent after an understanding of this disclosure. Further, although the examples described herein have a variety of configurations, other configurations are possible as will be apparent after an understanding of this disclosure.

An aspect of the present disclosure may provide a camera module having improved focus adjustment performance and performance of a shake compensation actuator.

In the present specification, an optical axis direction may refer to a direction, extending vertically along an optical axis of a lens module, or a direction, parallel to the optical axis.

A first direction may refer to a direction, perpendicular to the optical axis direction, and a second direction may refer to a direction, perpendicular to both the optical axis direction and the first direction.

A camera module according to an embodiment of the present disclosure may be mounted on a portable electronic device. The portable electronic device may be a portable electronic device such as a mobile communication terminal, a smartphone, a tablet PC, or the like.

Figure 2:
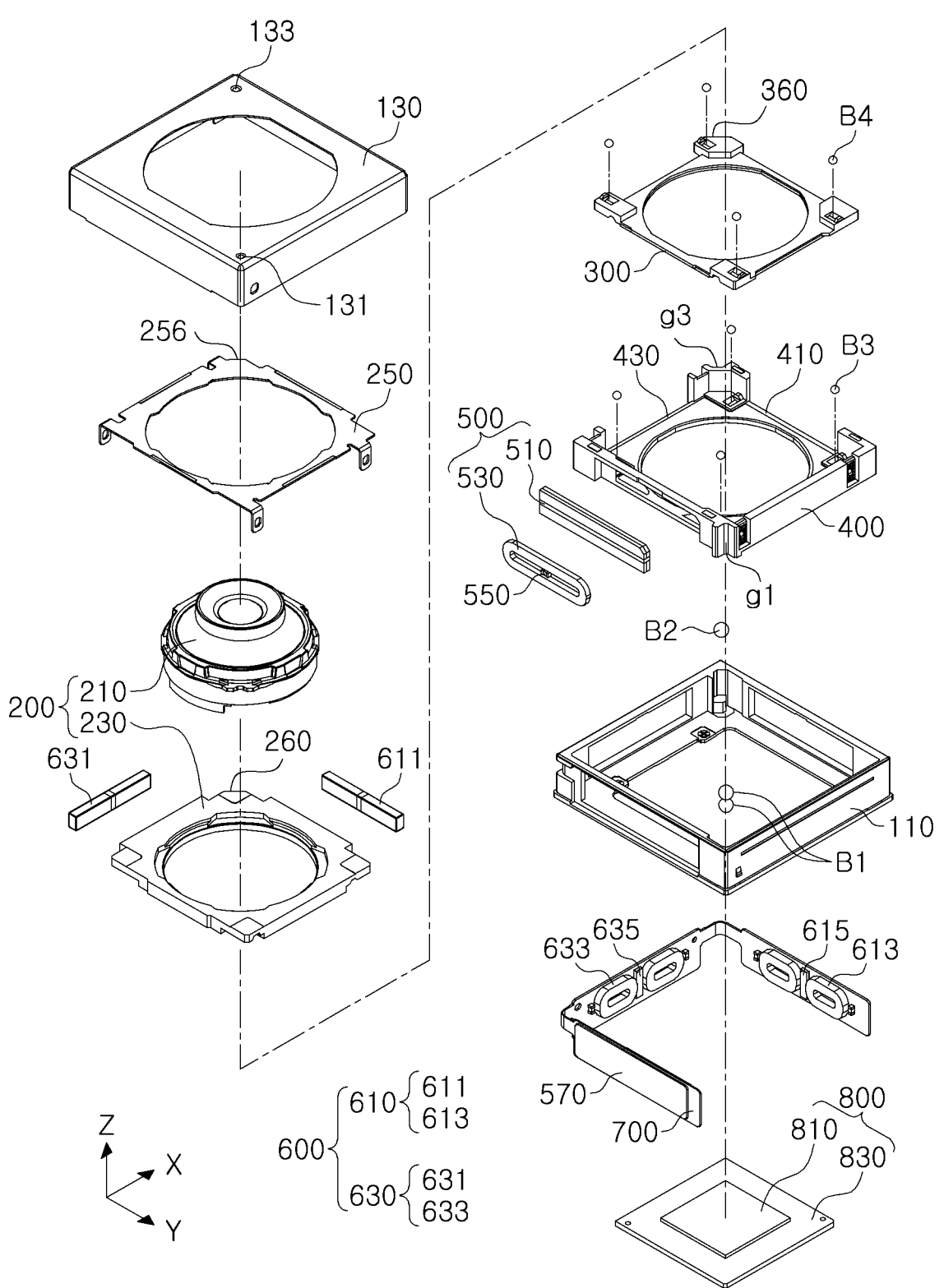
FIG. 2 is a schematic exploded perspective view of a camera module according to an embodiment of the present disclosure.

FIG. 1 is a perspective view of a camera module according to an embodiment of the present disclosure, and FIG. 2 is a schematic exploded perspective view of a camera module according to an embodiment of the present disclosure.

Figure 3:
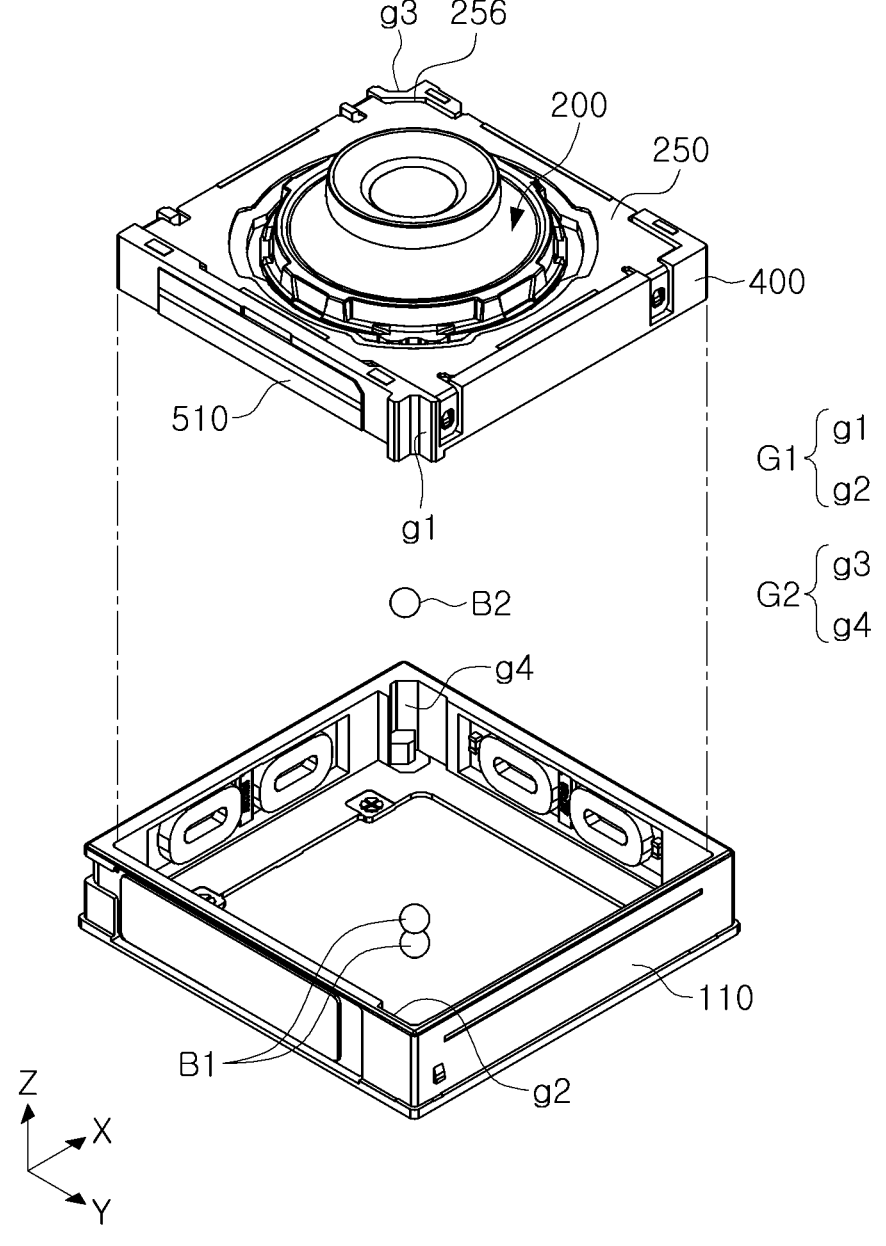
FIG. 3 is a perspective view illustrating a state in which a lens module and a carrier are separated from a housing in a camera module according to an embodiment of the present disclosure.
Figure 4:
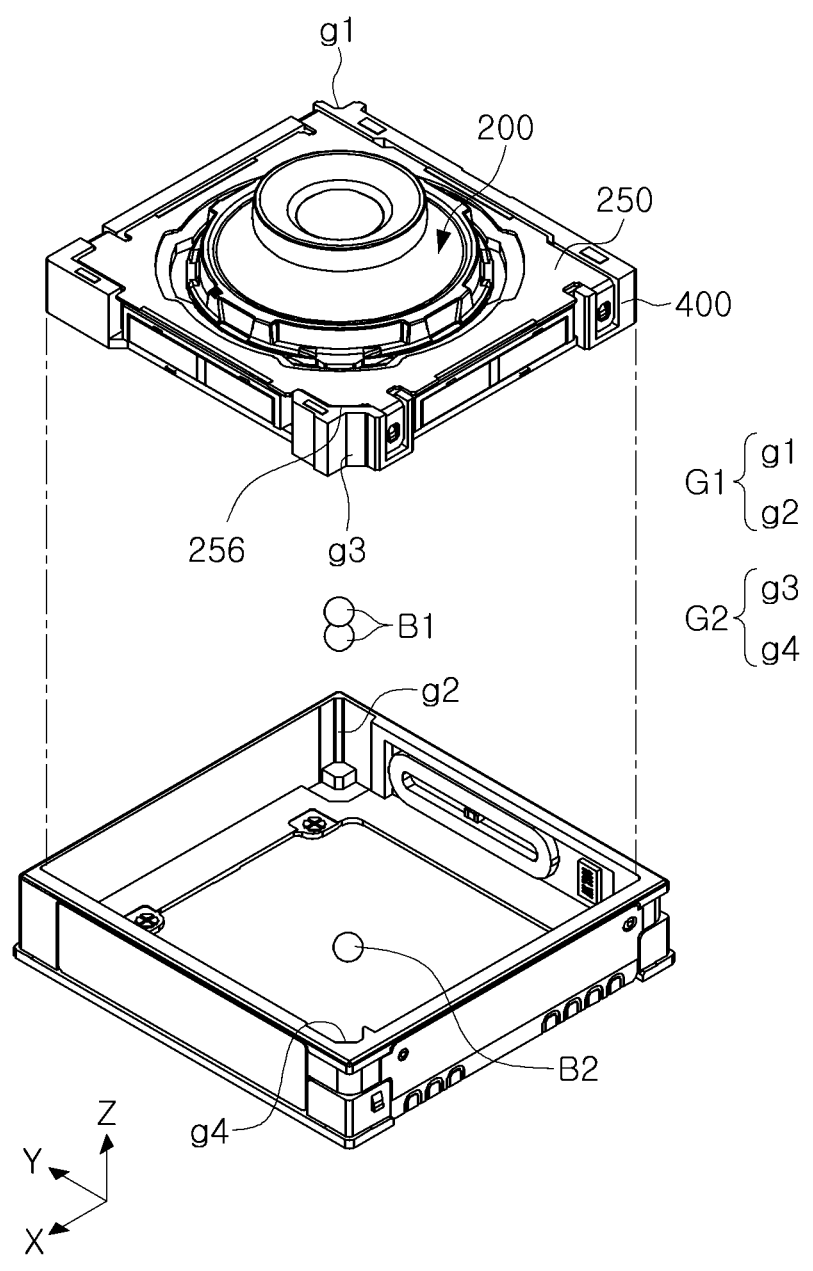
FIG. 4 is a perspective view of FIG. 3, viewed in a different direction.

FIG. 3 is a perspective view illustrating a state in which a lens module and a carrier are separated from a housing in a camera module according to an embodiment of the present disclosure, and FIG. 4 is a perspective view of FIG. 3, viewed in a different direction.

Referring to FIGS. 1 to 4, a camera module 1 according to an embodiment of the present disclosure may include a lens module 200, a carrier 400, a housing 110, and a first driver 500, and may further include a case 130.

The lens module 200 may include at least one lens and a lens barrel 210. The at least one lens may be disposed in the lens barrel 210. When a plurality of lenses are provided, the plurality of lenses may be mounted in the lens barrel 210 along an optical axis (Z-axis).

The lens module 200 may further include a lens holder 230 coupled to the lens barrel 210.

In an embodiment of the present disclosure, the lens module 200 may be a moving member that moves in the optical axis (Z-axis) direction during autofocus adjustment (AF). The lens module 200 may move in an optical axis (Z-axis) direction to adjust a focus.

The carrier 400 may be disposed in the housing 110, and may relatively move with respect to the housing 110 in the optical axis (Z-axis) direction.

The lens module 200 may be disposed on the carrier 400, and the carrier 400 and the lens module 200 may move together in the optical axis (Z-axis) direction. Therefore, a distance between the lens module 200 and an image sensor 810 may be changed to adjust a focus.

The carrier 400 may include a first opening H1 (see FIG. 9) through which incident light passes. The first opening H1 may have a circular shape, or a shape including a straight portion L1 (see FIG. 9) in the circular shape.

The housing 110 may have an internal space, and may have a quadrilateral box shape in which upper and lower portions are exposed. The case 130 may be combined with the housing 110 to protect an internal configuration of the camera module 1.

The case 130 may include a first protrusion 131 and a second protrusion 133, protruding toward the first ball member B1 and the second ball member B2, which will be described later. The first protrusion 131 and the second protrusion 133 may serve as a stopper and a buffer member for regulating movement ranges of the first ball member B1 and the second ball member B2.

An image sensor module 800 may be disposed below the housing 110. The image sensor module 800 may be coupled to the housing 110.

The image sensor module 800 may include an image sensor 810 having an imaging surface and a printed circuit board 830 connected to the image sensor 810, and may further include an infrared filter.

The infrared filter serves to block light in an infrared range, among light incident through the lens module 200.

The image sensor 810 may convert the light incident through the lens module 200 into an electrical signal. For example, the image sensor 810 may be a charge coupled device (CCD) or a complementary metal-oxide semiconductor (CMOS).

The electrical signal converted by the image sensor 810 may be output as an image through a display unit of a portable electronic device.

The image sensor 810 may be fixed to the printed circuit board 830, and may be electrically connected to the printed circuit board 830 by wire bonding.

The first driver 500 may generate driving force in the optical axis (Z-axis) direction to move the carrier 400 in the optical axis (Z-axis) direction.

The first driver 500 may include a first magnet 510 and a first coil 530. The first magnet 510 and the first coil 530 may be disposed to face each other in a direction, perpendicular to the optical axis (Z-axis).

The first magnet 510 may be disposed on the carrier 400. For example, the first magnet 510 may be disposed on one side surface of the carrier 400.

A back yoke may be disposed between the carrier 400 and the first magnet 510. The back yoke may improve driving force by preventing leakage of magnetic flux of the first magnet 510.

The first magnet 510 may be magnetized such that one surface thereof (e.g., a surface facing the first coil 530) has both an N pole and an S pole. For example, an N pole, a neutral region, and an S pole may be sequentially provided on the one surface of the first magnet 510 facing the first coil 530 in the optical axis (Z-axis) direction.

The first magnet 510 may be magnetized such that the other surface thereof (e.g., a surface opposite to the one surface) has both an N pole and an S pole. For example, an S pole, a neutral region, and an N pole may be sequentially provided on the other surface of the first magnet 510 in the optical axis (Z-axis) direction.

The first coil 530 may be disposed to face the first magnet 510. For example, the first coil 530 may be disposed to face the first magnet 510 in a direction, perpendicular to the optical axis (Z-axis).

The first coil 530 may be disposed on a substrate 700, and the substrate 700 may be mounted on the housing 110 such that the first magnet 510 and the first coil 530 face each other in a direction, perpendicular to the optical axis (Z-axis). Thus, the first coil 530 may be fixed to the housing 110.

The first magnet 510 may be a moving member mounted on the carrier 400 and moving in the optical axis (Z-axis) direction, together with the carrier 400, and the first coil 530 may be a fixed member fixed to the substrate 700.

When power is applied to the first coil 530, the carrier 400 may move in the optical axis (Z-axis) direction by electromagnetic force between the first magnet 510 and the first coil 530.

Since the lens module 200 is accommodated in the carrier 400, the lens module 200 may also move in the optical axis (Z-axis) direction by movement of the carrier 400.

A first ball member B1 and a second ball member B2 may be disposed between the carrier 400 and the housing 110. The first ball member B1 and the second ball member B2 may be spaced apart from each other in a direction, perpendicular to the optical axis (Z-axis).

The first ball member B1 and the second ball member B2 may include at least one ball, respectively. Also, the number of balls included in the first ball member B1 may be different from the number of balls included in the second ball member B2.

For example, the first ball member B1 may include two or more balls disposed in the optical axis (Z-axis) direction, and the second ball member B2 may include a smaller number of balls than the first ball member B1.

The first ball member B1 and the second ball member B2 may be rolled in the optical axis (Z-axis) direction, when the carrier 400 moves in the optical axis (Z-axis) direction.

A first yoke 570 may be disposed in the housing 110. The first yoke 570 may be disposed to face the first magnet 510. For example, the first coil 530 may be disposed on one surface of the substrate 700, and the first yoke 570 may be disposed on the other surface of the substrate 700 (e.g., a surface opposite to the one surface). Therefore, the first yoke 570 may be disposed such that a position thereof is fixed with respect to the housing 110.

The first magnet 510 and the first yoke 570 may generate attractive force therebetween. For example, attractive force may act between the first magnet 510 and the first yoke 570 in a direction, perpendicular to the optical axis (Z-axis).

The first ball member B1 and the second ball member B2 may be in contact with the carrier 400 and the housing 110, respectively, by the attractive force between the first magnet 510 and the first yoke 570.

Guide grooves may be disposed in a plane in which the carrier 400 and the housing 110 face each other. For example, a first guide groove portion G1 may be disposed on one side of the plane on which the carrier 400 and the housing 110 face each other, and a second guide groove portion G2 may be disposed on the other side of the plane on which the carrier 400 and the housing 110 face each other. The first guide groove portion G1 and the second guide groove portion G2 may be spaced apart from each other in a direction, perpendicular to the optical axis (Z-axis) (e.g., a diagonal direction of the carrier 400).

The first guide groove portion G1 and the second guide groove portion G2 may extend in a direction, parallel to the optical axis (Z-axis). The first ball member B1 may be disposed in the first guide groove portion G1, and the second ball member B2 may be disposed in the second guide groove portion G2.

The first guide groove portion G1 may include a first guide groove g1 formed in the carrier 400 and a second guide groove g2 formed in the housing 110, and the second guide groove portion G2 may include a third guide groove g3 formed in the carrier 400 and a fourth guide groove g4 formed in the housing 110. The guide grooves may be formed to have a length extending in the optical axis (Z-axis) direction, respectively.

The first guide groove g1 and the second guide groove g2 may be disposed to face each other in a direction, perpendicular to the optical axis (Z-axis) direction, and the first ball member B1 may be disposed in a space between the first guide groove g1 and the second guide groove g2.

Among the plurality of balls included in the first ball member B1, balls located on the outermost side in a direction, parallel to the optical axis (Z-axis), may be in contact with the first guide groove g1 and the second guide groove g2, respectively, at two points.

For example, among the plurality of balls included in the first ball member B1, outermost balls in a direction, parallel to the optical axis (Z-axis), may be in contact with the first guide groove g1 at two points, and may be in contact with the second guide groove g2 at two points.

The first ball member B1, the first guide groove g1, and the second guide groove g2 may function as a main guide for guiding movement of the carrier 400 in the optical axis (Z-axis) direction.

In addition, the third guide groove g3 and the fourth guide groove g4 may be disposed to face each other in a direction, perpendicular to the optical axis (Z-axis) direction, and the second ball member B2 may be disposed in a space between the third guide groove g3 and the fourth guide groove g4.

At least one ball included in the second ball member B2 may be in contact with any one of the third guide groove g3 or the fourth guide groove g4 at two points, and may be in contact with the other one thereof at one (1) point.

For example, when the second ball member B2 includes a ball, the ball included in the second ball member B2 may be in contact with the third guide groove g3 at one (1) point, and may be in contact with the fourth guide groove g4 at two points (a case in which the former and the latter are switched is also possible).

The second ball member B2, the third guide groove g3, and the fourth guide groove g4 may function as an auxiliary guide for supporting movement of the carrier 400 in the optical axis (Z-axis) direction.

When the second ball member B2 includes three or more balls, outermost balls in the optical axis (Z-axis) direction, among the three balls, may be in contact with any one of the third guide groove g3 and the fourth guide groove g4 at two points, and may be in contact with the other one thereof at one point.

The first ball member B1 and the second ball member B2 may be spaced apart from each other in a direction, perpendicular to the optical axis (Z-axis). In addition, the number of balls included in the first ball member B1 may be different from the number of balls included in the second ball member B2.

For example, the first ball member B1 may include two or more balls disposed in the optical axis (Z-axis) direction, and the second ball member B2 may include a smaller number of balls than the number of balls included in the first ball member B1.

The number of balls belonging to each of the ball members may be changed on the premise that the number of balls belonging to the first ball member B1 is different from the number of balls belonging to the second ball member B2.

When the first ball member B1 includes three balls and the second ball member B2 includes two balls, among the three balls included in the first ball member B1, two balls disposed on outermost sides in a direction, parallel to the optical axis (Z-axis), may have diameters equal to each other, and one ball disposed therebetween may have a diameter, smaller than each of the diameters of the balls disposed on the outermost sides.

For example, among the plurality of balls included in the first ball member B1, the two balls disposed on the outermost sides in a direction, parallel to the optical axis (Z-axis), may have a first diameter, the one ball disposed therebetween may have a second diameter, and the first diameter may be greater than the second diameter.

The two balls included in the second ball member B2 may have diameters equal to each other. For example, each of the two balls included in the second ball member B2 may have a third diameter.

Also, the first diameter may be equal to the third diameter. In this case, the fact that the diameters are equal to each other may mean not only a case in which the diameters are physically equal to each other, but also a case in which the diameters include an error in a manufacturing process.

A distance between centers of outermost balls in a direction, parallel to the optical axis (Z-axis), among the plurality of balls included in the first ball member B1, may be different from a distance between centers of outermost balls in a direction, parallel to the optical axis (Z-axis), among the plurality of balls included in the second ball member B2.

For example, a distance between centers of the two balls having the first diameter may be greater than a distance between centers of the two balls having the third diameter.

When the first ball member B1 includes two balls and the second ball member B2 includes one ball, the two balls of the first ball member B1 may have diameters equal to each other. In addition, a diameter of the one ball of the second ball member B2 may be equal to or different from a diameter of each of the two balls of the first ball member B1.

Figure 5A:
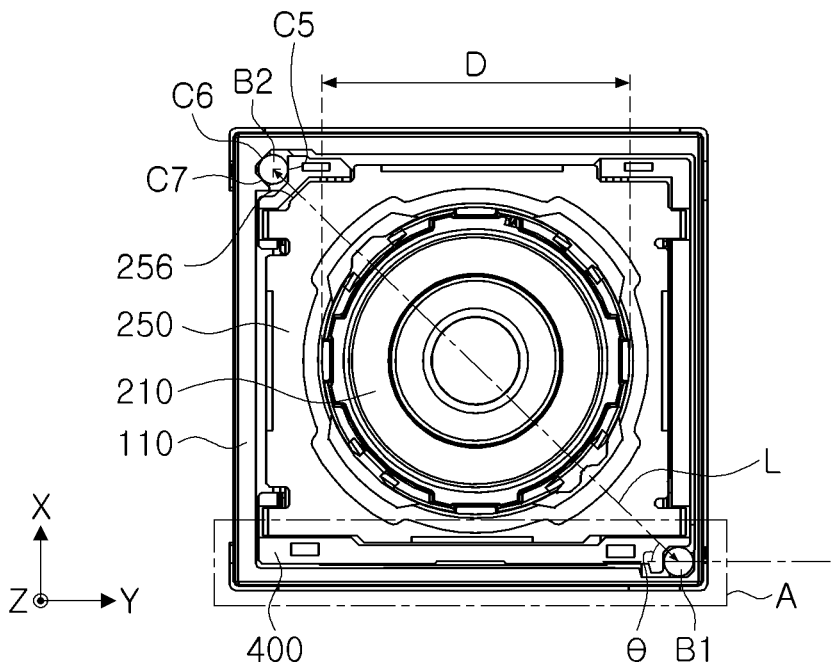
FIG. 5A is a plan view of a state in which a case is removed from a camera module according to an embodiment of the present disclosure.
Figure 5B:
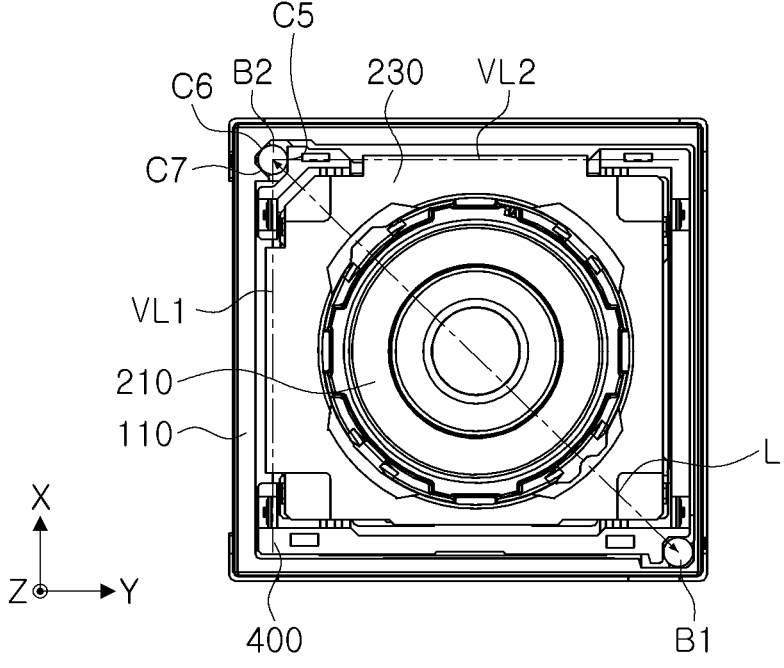
FIG. 5B is a plan view in which a lens holder is upwardly exposed and a stopper is removed from the plan view of FIG. 5A.
Figure 6:
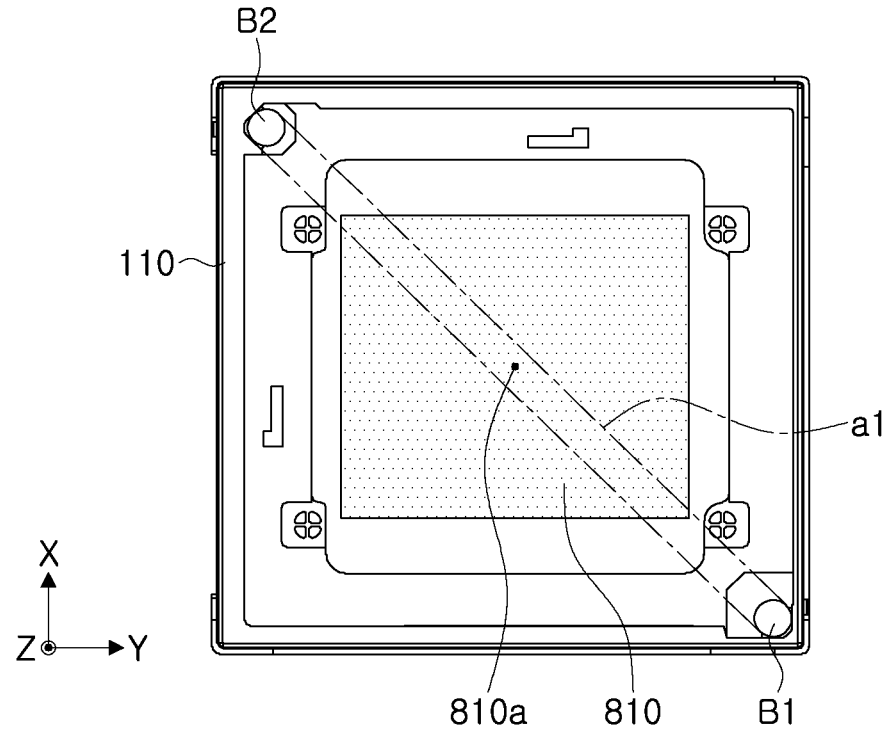
FIG. 6 is a top cross-sectional view of an embodiment of the present disclosure.

FIGS. 5A and 5B are plan views of a camera module according to an embodiment of the present disclosure in a state in which a case is removed, and FIG. 6 is a top cross-sectional view of an embodiment of the present disclosure.

Figure 7:
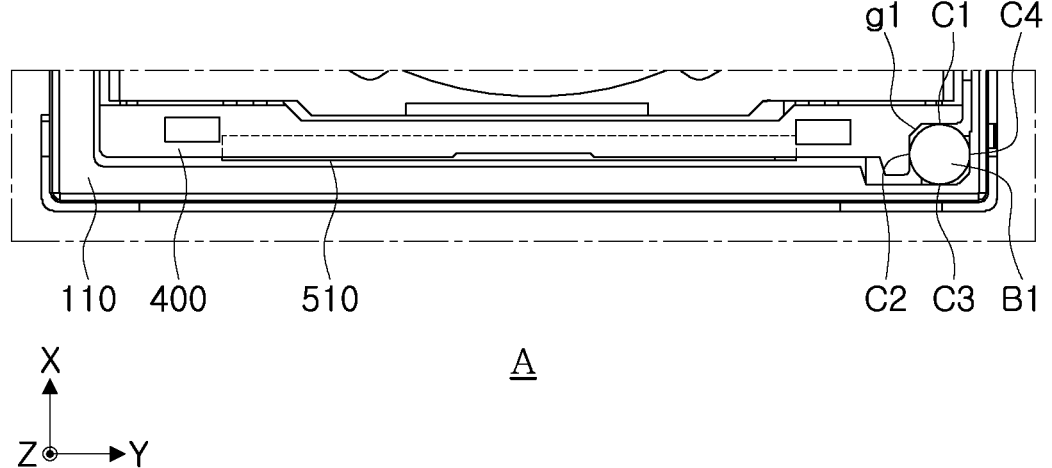
FIG. 7 is an enlarged view of portion A of FIG. 5A.
Figure 8:
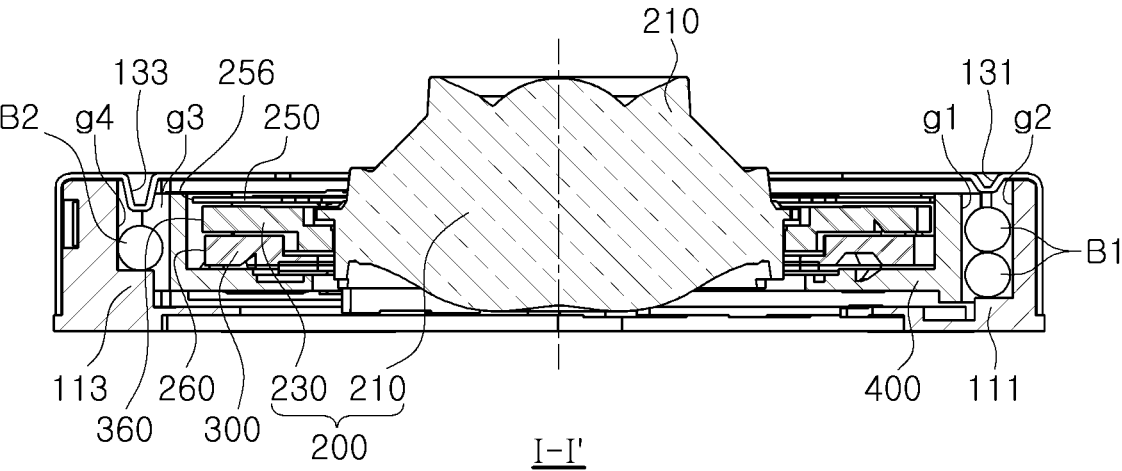
FIG. 8 is a cross-sectional view of FIG. 1, taken along line I-I'.

FIG. 7 is an enlarged view of portion A of FIG. 5A, and FIG. 8 is a cross-sectional view of FIG. 1, taken along line I-I'.

Referring to FIGS. 5A, 5B, and 6, a first ball member B1 and a second ball member B2 may be spaced apart from each other in a direction, perpendicular to an optical axis (Z-axis).

For example, the first ball member B1 and the second ball member B2 may be spaced apart from each other in a diagonal direction of a carrier 400 (or a housing 110). Therefore, a distance between the first ball member B1 and the second ball member B2 may be greater than a length of one side surface of the carrier 400.

In this case, the distance between the first ball member B1 and the second ball member B2 may mean a shortest distance between a ball included in the first ball member B1 and a ball included in the second ball member B2, when viewed in the optical axis (Z-axis) direction.

In addition, the length of the one side surface of the carrier 400 may mean a distance between both ends of the one side surface of the carrier 400 in the second direction (Y-direction), when the carrier 400 is viewed in the first direction (X-direction). Alternatively, the length of the one side surface of the carrier 400 may mean a distance between both ends of the one side surface of the carrier 400 in the first direction (X-direction), when the carrier 400 is viewed in the second direction (Y-direction).

In a general camera module, a plurality of balls may be respectively disposed on both sides of a first magnet in a longitudinal direction.

In a camera module 1 according to an embodiment of the present disclosure, a first ball member B1 and a second ball member B2 may not be disposed on both sides of a first magnet 510 in a longitudinal direction, but may be spaced apart in a diagonal direction of a carrier 400.

Therefore, the first ball member B1 may be disposed closer to the first magnet 510, and the second ball member B2 may be disposed farther from the first magnet 510 (i.e., farther than the first ball member B1). A virtual line extending from one surface of the first magnet 510 contacting the carrier 400 in the longitudinal direction of the first magnet 510 may pass through the first ball member B1, and may be spaced apart from the second ball member B2.

When a plurality of balls are disposed on both sides of the first magnet in the longitudinal direction, all the balls may be pressurized in the same direction (e.g., a direction in which the first magnet and a first yoke face each other) due to attractive force between the first magnet and the first yoke. Also, in a state in which the carrier is supported in this manner, the carrier may move in the optical axis (Z-axis) direction.

Since a center of the carrier may be spaced apart from a surface of the carrier supported by the plurality of balls, when the carrier moves in the optical axis (Z-axis) direction, the carrier may not move in a direction, parallel to the optical axis (Z-axis), and tilt may occur.

In a camera module 1 according to an embodiment of the present disclosure, since a first ball member B1 may be disposed on any one of both sides of a first magnet 510 in a longitudinal direction, and a second ball member B2 may be disposed to be spaced apart from the first ball member B1 in a diagonal direction of a carrier 400, rotational force about the first ball member B1 may be generated by attractive force between the first magnet 510 and a first yoke 570.

Therefore, the carrier 400 may rotate about the first ball member B1 as a rotation axis, and the second ball member B2 may be maintained to contact the carrier 400 and a housing 110 by this rotational force.

For example, the first ball member B1 and the second ball member B2 may be arranged to be spaced apart in the diagonal direction of the carrier 400, to generate rotational force in the carrier 400, and the first ball member B1 and the second ball member B2 may be in contact with the carrier 400 and the housing 110 by this rotational force.

Although the rotational force is applied to the carrier 400, the carrier 400 may not rotate because the first ball member B1 and the second ball member B2 support the carrier 400, and the carrier 400 may be supported to move in the optical axis (Z-axis) direction.

Since, in a camera module 1 according to an embodiment of the present disclosure, a center of a carrier 400 may be located in a region in which a portion supported by a first ball member B1 and a portion supported by a second ball member B2 are connected to each other (e.g., since a region by which the carrier 400 is supported and the center of the carrier 400 may not be spaced apart), the carrier 400 may move parallel to an optical axis (Z-axis). Therefore, driving stability during focus adjustment may be improved.

A center of one side surface of the carrier 400 on which a first magnet 510 is mounted may not coincide with a center of the first magnet 510.

For example, when viewed in the first direction (X-direction), the center of the first magnet 510 may be disposed closer to the first ball member B1, as compared to the center of the one side surface of the carrier 400. In this case, since attractive force between the first magnet 510 and a first yoke 570 occurs in a position close to the first ball member B1, which may be a main rolling portion, driving stability during focus adjustment may be further improved.

Alternatively, when viewed in the first direction (X-direction), the center of the first magnet 510 may be disposed farther from the first ball member B1, as compared to the center of the one side surface of the carrier 400. In this case, since rotational force may be more easily generated in the carrier 400 by the attractive force between the first magnet 510 and the first yoke 570, the carrier 400 may be more firmly supported.

When viewed in the optical axis (Z-axis) direction, a virtual line connecting a center of the first ball member B1 (e.g., a center of a ball included in the first ball member B1) and a center of the second ball member B2 (e.g., a center of a ball included in the second ball member B2) to each other may have an acute angle (θ) with respect to a line extending in a longitudinal direction of the first magnet 510 from one surface of the first magnet 510.

When viewed in the optical axis (Z-axis) direction, the virtual line connecting the center of the first ball member B1 and the center of the second ball member B2 to each other may have an acute angle (θ) with respect to one side surface of the carrier 400 on which the first magnet 510 is mounted 400.

When viewed in the optical axis (Z-axis) direction, the virtual line connecting the center of the first ball member B1 and the center of the second ball member B2 to each other may pass through a lens module 200. Specifically, the virtual line connecting the center of the first ball member B1 and the center of the second ball member B2 to each other may pass through at least one lens accommodated in the lens module 200. For example, when viewed in the optical axis direction, a virtual line connecting the first ball member B1 and the second ball member B2 may pass through a first opening H1.

A length L of the virtual line connecting the center of the first ball member B1 and the center of the second ball member B2 to each other may be greater than a maximum diameter D of a lens barrel 210.

When viewed in the optical axis (Z-axis) direction, the center of the carrier 400 (or a center of the lens module 200) may be located in a region a1 connecting both ends of the first ball member B1 and both ends of the second ball member B2 to each other.

When viewed in the optical axis (Z-axis) direction, a center 810a of an image sensor 810 (e.g., a center of an effective imaging surface of the image sensor 810) may be located in the region a1 connecting both ends of the first ball member B1 and both ends of the second ball member B2.

Referring to FIGS. 3 and 4, a first guide groove portion G1 and a second guide groove portion G2 may be disposed between a carrier 400 and a housing 110.

The first guide groove portion G1 may include a first guide groove g1 formed in the carrier 400 and a second guide groove g2 formed in the housing 110, and the second guide groove portion G2 may include a third guide groove g3 formed in the carrier 400 and a fourth guide groove g4 formed in the housing 110.

A first ball member B1 may be disposed between the first guide groove g1 and the second guide groove g2, and a second ball member B2 may be disposed between the third guide groove g3 and the fourth guide groove g4.

A direction in which the first guide groove g1 and the second guide groove g2 face each other may be different from a direction in which the third guide groove g3 and the fourth guide groove g4 face each other.

For example, a center of the first guide groove g1 and a center of the second guide groove g2 may face each other in a diagonal direction of the carrier 400, and a center of the third guide groove g3 and a center of the fourth guide groove g4 may face in the second direction (Y-direction).

Referring to FIG. 7, a first contact point C1 and a second contact point C2 contacting a first ball member B1 may be formed in a first guide groove g1, and a third contact point C3 and a fourth contact point C4 contacting the first ball member B1 may be formed in a second guide groove g2.

Also, the first contact point C1 and the third contact point C3 may face each other in the first direction (X-direction), perpendicular to the optical axis (Z-axis) direction. The second contact point C2 and the fourth contact point C4 may face each other in the second direction (Y-direction), perpendicular to the optical axis (Z-axis) direction and the first direction (X-direction).

For example, when viewed in the optical axis (Z-axis) direction, the first guide groove g1 may have a substantially '⌈' shape, and the second guide groove g2 may have a substantially '⌋' shape. For example, when viewed in the optical axis (Z-axis) direction, the first guide groove g1 may have a substantially upper left inside corner shape, and the second guide groove g2 may have a substantially lower right inside corner shape.

Referring to FIGS. 5A and 5B, a fifth contact point C5 contacting a second ball member B2 may be formed in a third guide groove g3, and a sixth contact point C6 and a seventh contact point C7 contacting the second ball member B2 may be formed in a fourth guide groove g4.

When viewed in the optical axis (Z-axis) direction, the third guide groove g3 may have a substantially 'l' shape, and the fourth guide groove g4 may have a substantially '<' shape. For example, when viewed in the optical axis (Z-axis) direction, the third guide groove g3 may have a substantially flat shape, and the fourth guide groove g4 may have a substantially inside angle shape opening toward the substantially flat shape of the third guide groove g3.

A length of the first guide groove portion G1 in the optical axis (Z-axis) direction may be different from a length of the second guide groove portion G2 in the optical axis (Z-axis) direction.

For example, referring to FIG. 8, a length of the second guide groove g2 formed in the housing 110 in the optical axis (Z-axis) direction may be greater than a length of the fourth guide groove g4 formed in the housing 110 in the optical axis (Z-axis) direction. To this end, a first support protrusion 111 protruding toward the first ball member B1 and a second support protrusion 113 protruding toward the second ball member B2 may be formed on a bottom surface of the housing 110. A length of the second support protrusion 113 in the optical axis (Z-axis) direction may be greater than a length of the first support protrusion 111 in the optical axis (Z-axis) direction.

In addition, a first protrusion 131 protruding toward the first ball member B1 and a second protrusion 133 protruding toward the second ball member B2 may be formed on the case 130. A length of the second protrusion 133 in the optical axis (Z-axis) direction may be greater than a length of the first protrusion 131 in the optical axis (Z-axis) direction.

The camera module 1 may detect a position of the carrier 400 in the optical axis (Z-axis) direction.

To this end, a first position sensor 550 may be provided. The first position sensor 550 may be disposed on the substrate 700 to face the first magnet 510. The first position sensor 550 may be a hall sensor.

The camera module 1 may compensate for shaking during photographing by moving the lens module 200 in a direction, perpendicular to the optical axis (Z-axis). To this end, the camera module 1 may include a second driver 600 that moves the lens module 200 in a direction, perpendicular to the optical axis (Z-axis).

Referring to FIG. 2, a guide frame 300 and the lens module 200 may be sequentially accommodated in the carrier 400. For example, the guide frame 300 may be disposed between the carrier 400 and the lens module 200. The guide frame 300 may have a quadrilateral plate shape having a hollow (second opening) H2.

In addition, the lens module 200 may include a first avoidance portion 260 securing space in which at least one of the first ball member B1 or the second ball member B2 is disposed, which may be a medium for the carrier 400 to be supported by the housing 110. In this embodiment and the drawings, for convenience of description, a structure for securing space in which the second ball member B2 is disposed is illustrated as a structure including first to third avoidance portions 260, 360, and 256, but is not limited thereto. The avoidance portions 260, 360, and 256 may also be applied to a structure for securing space in which the first ball member B1 is disposed or a structure for securing space in which both the first and second ball members B1 and B2 are disposed, according to a disclosed structural deformation. In addition, hereinafter, an avoidance portion may include all of the first to third avoidance portions 260, 360, and 256, or may refer to at least one of the first to third avoidance portions 260, 360, and 256.

The first avoidance portion 260 may be provided in the lens holder 230. In addition, the guide frame 300 disposed between the carrier 400 and the lens module 200 may also include the second avoidance portion 360 for the same purpose. The first avoidance portion 260 and the second avoidance portion 360 may be provided in overlapping positions in the optical axis direction. Furthermore, the third avoidance portion 256 may be provided in a stopper 250 for the same purpose. The third avoidance portion 256 may also be provided in a position overlapping the first and second avoidance portions 260 and 360 in the optical axis direction.

Also, the carrier 400 may be provided to have a substantially quadrilateral shape. In addition, the lens module 200 may be provided to have an edge having a substantially quadrilateral shape. In detail, the lens holder 230 surrounding the lens barrel 210 may be provided to have a substantially quadrilateral shape.

The first avoidance portion 260 may be provided to have a cut shape in a position overlapping the second ball member B2 in the optical axis direction. In detail, the lens holder 230 may have a substantially tetragonal shape, and the lens holder 230 may include the first avoidance portion 260 having a shape in which a corner is cut, and the second ball member B2 and the third guide groove g3 may be structurally disposed in a space formed by cutting the first avoidance portion 260.

For example, referring to FIG. 5B, the lens holder 230 may have a substantially quadrilateral shape having four edges, and at least a portion of the second ball member B2 may be located in an internal space of a virtual corner formed by a virtual intersection point at which virtual lines VL1 and VL2 extending from two edges of the lens holder 230 adjacent to the second ball member B2 meet. For example, the virtual corner may be the first avoidance portion 260, which may be a cut portion of the corner of the lens holder 230, and accordingly, the virtual line extending from the lens holder 230 may intersect with the second ball member B2, or at least a portion of the second ball member B2 may be located in the internal space of the virtual corner.

In addition, the guide frame 300 may be provided between the carrier 400 and the lens holder 230 in the optical axis direction, and the second avoidance portion 360 may be provided in the guide frame 300.

The guide frame 300 may have a substantially quadrilateral shape, and the second avoidance portion 360 may be provided in a shape in which a corner of the guide frame 300 is cut. Also, the second avoidance portion 360 may be provided in a position overlapping the first avoidance portion 260 in the optical axis direction. In addition, the second ball member B2 and the third guide groove g3 may be structurally disposed in a space formed by cutting the second avoidance portion 360.

In addition, the carrier 400 may be provided with a stopper 250 to cover the lens module 200, in detail, an upper portion of the lens holder 230. The stopper 250 may have a substantially quadrilateral shape, and the third avoidance portion 256 may be provided in a shape in which a corner of the stopper 250 is cut. Also, the third avoidance portion 256 may be provided in a position overlapping the first and second avoidance portions 260 and 360 in the optical axis direction. In addition, the second ball member B2 and the third guide groove g3 may be structurally disposed in a space formed by cutting the third avoidance portion 256.

Therefore, as illustrated in FIG. 8, a space formed by the first avoidance portion 260 and a space formed by the second avoidance portion 360 may both overlap in the optical axis direction. A space formed by the third avoidance portion 256 may also overlap the space formed by the first avoidance portion 260 and the space formed by the second avoidance portion 360 in the optical axis direction.

In addition, the second ball member B2 and the third guide groove g3 guiding movement thereof may be disposed in the spaces formed by the first to third avoidance portions 260, 360, and 256, as illustrated in the drawings. As described above, this structure is not limited to the second ball member B2 and the third guide groove g3, and according to structural deformation, at least one of the first and second ball members B1 and B2 may be applied to at least any one of the third and fourth guide grooves g3 and g4.

In addition, as illustrated in FIGS. 5A and 5B, in the above structure, in a state in which the carrier 400 and the lens module 200 are coupled to each other, the second ball member B2 may be exposed, and the third guide groove g3 may also be exposed, to be seen from the top in the optical axis direction. As described above, this structure is not limited to the second ball member B2 and the third guide groove g3, but, according to structural deformation, may be applied to at least any one of the first and second ball members B1 and B2 and at least any one of the third and fourth guide grooves g3 and g4.

In this structure, the avoidance portions 260, 360, and 256 may be provided to correspond to positions in which the third guide groove g3 is formed in the carrier 400. As described above, this structure is not limited to the second ball member B2 and the third guide groove g3, but, according to structural deformation, may be applied to at least any one of the first and second ball members B1 and B2 and at least any one of the third and fourth guide grooves g3 and g4. Therefore, the avoidance portions 260, 360, and 256 may be provided in positions corresponding to the respective guide grooves g3 and g4 according to structural deformation.

The guide frame 300 and the lens module 200 may move together in the first direction (X-direction) relative to the carrier 400 by driving force of the second driver 600, and the lens module 200 may move in the second direction (Y-direction), relative to the guide frame 300.

The carrier 400 may include a first opening H1 through which incident light passes. The first opening H1 may have a circular shape or a shape including a straight portion L1 in the circular shape.

The guide frame 300 may include a second opening H2 through which incident light passes. The second opening H2 may have a circular track shape including a straight portion L2.

When viewed in the optical axis direction, the second opening H2 may move in an internal space of the first opening H1.

For example, when viewed from the optical axis direction, the first opening H1 may have a width, wider than a width of the second opening H2, and the second opening H2 may move in the internal space of the first opening H1. Therefore, a round portion of the track-shaped second opening H2 may be a portion of a circle having the same or smaller radius as the circular shape of the first opening H1 (R1≥R2, L1≤L2, where R1 is the radius of the round portion of the track-shaped first opening H1, R2 is the radius of the round portion of the track-shaped second opening H2, L1 is the straight portion of the first opening H1, and L2 is the straight portion of the second opening H2, see FIG. 9).

Also, the second opening H2 may have a length D2_max in one direction, perpendicular to the optical axis, shorter than a length D1_max in a different direction, perpendicular to the optical axis direction and the one direction. The second opening H2 may have a center O2 and the first opening H1 may have a center O1.

The second driver 600 may include a first sub-driver 610 and a second sub-driver 630. The first sub-driver 610 may generate driving force in the first direction (X-direction), and the second sub-driver 630 may generate driving force in the second direction (Y-direction).

The first sub-driver 610 may include a second magnet 611 and a second coil 613. The second magnet 611 and the second coil 613 may face each other in the first direction (X-direction).

The second magnet 611 may be disposed on the lens module 200. For example, the second magnet 611 may be mounted on a side surface of the lens holder 230.

The second coil 613 may be disposed to face the second magnet 611. For example, the second coil 613 may be disposed to face the second magnet 611 in the first direction (X-direction).

The second coil 613 may have a hollow donut shape. The second coil 613 may include a plurality of coils. For example, the second coil 613 may include two coils spaced apart from each other in the second direction (Y-direction), and each of the coils may be disposed to face the second magnet 611. When there are a plurality of second coils 613, a second position sensor 615 may be provided between second coils 613.

In addition, polarities of one surface of the second magnet 611 facing the two coils may be different from each other. For example, one of the two coils may face an N pole of the second magnet 611, and the other thereof may face an S pole of the second magnet 611.

During shake correction, the second magnet 611 may be a moving member mounted on the lens holder 230, and the second coil 613 may be a fixed member fixed on the housing 110.

When power is applied to the second coil 613, the lens module 200 and the guide frame 300 may move in the first direction (X-direction) by electromagnetic force between the second magnet 611 and the second coil 613.

The second magnet 611 and the second coil 613 may generate driving force in opposite directions (e.g., the first direction (X-direction)).

The second sub-driver 630 may include a third magnet 631 and a third coil 633. The third magnet 631 and the third coil 633 may face each other in the second direction (Y-direction).

The third magnet 631 may be disposed on the lens module 200. For example, the third magnet 631 may be mounted on another side surface of the lens holder 230.

The third coil 633 may be disposed to face the third magnet 631. For example, the third coil 633 may be disposed to face the third magnet 631 in the second direction (Y-direction).

The third coil 633 may have a hollow donut shape. The third coil 633 may include a plurality of coils. For example, the third coil 633 may include two coils spaced apart from each other in the first direction (X-direction), and each of the coils may be disposed to face the third magnet 631. When there are a plurality of third coils 633, a third position sensor 635 may be provided between the third coils 633.

In addition, polarities of one surface of the third magnet 631 facing the two coils may be different from each other. For example, one of the two coils may face an N pole of the third magnet 631, and the other thereof may face an S pole of the third magnet 631.

The second coil 613 and the third coil 633 may be provided on the substrate 700. For example, the second coil 613 and the third coil 633 may be disposed on the substrate 700 to face the second magnet 611 and the third magnet 631, respectively.

The substrate 700 may be mounted on a side surface of the housing 110, and the second coil 613 and the third coil 633 may directly face the second magnet 611 and the third magnet 631, respectively.

The substrate 700 may be mounted on the housing 110 to cover three side surfaces of the housing 110. In an embodiment, when viewed in the optical axis (Z-axis) direction, the substrate 700 may have a substantially 'C' shape.

The first ball member B1 may be disposed at a corner of one side of the housing 110, and the second ball member B2 may be disposed at a corner of the other side of the housing 110. The substrate 700 may be disposed to surround the corner of the other side of the housing 110.

During shake correction, the third magnet 631 may be a moving member mounted on the lens holder 230, and the third coil 633 may be a fixed member fixed on the housing 110.

When power is applied to the third coil 633, the lens module 200 may move in the second direction (Y-direction) by electromagnetic force between the third magnet 631 and the third coil 633.

The third magnet 631 and the third coil 633 may generate driving force in opposite directions (e.g., the second direction (Y-direction)).

The second magnet 611 and the third magnet 631 may be disposed perpendicular to each other in a plane, perpendicular to the optical axis (Z-axis), and the second coil 613 and the third coil 633 may be also disposed perpendicular to each other in a plane, perpendicular to the optical axis (Z-axis).

The second magnet 611 and the third magnet 631 may be disposed closer to the second ball member B2 than to the first ball member B1.

In an embodiment, a virtual line extending in a longitudinal direction of the second magnet 611 from one surface of the second magnet 611 contacting the lens holder 230 may pass through the second ball member B2, and may be spaced apart from the first ball member B1. In addition, a virtual line extending in a longitudinal direction of the third magnet 631 from one surface of the third magnet 631 contacting the lens holder 230 may pass through the second ball member B2, and may be spaced apart from the first ball member B1.

In a camera module 1 according to an embodiment of the present disclosure, a plurality of ball members supporting the guide frame 300 and the lens module 200 may be provided. The plurality of ball members may serve to guide movement of the guide frame 300 and the lens module 200 in a shake correction process. In addition, the plurality of ball members may also function to maintain a distance between the carrier 400, the guide frame 300, and the lens module 200.

The plurality of ball members may include a third ball member B3 and a fourth ball member B4.

The third ball member B3 may guide movement of the guide frame 300 and the lens module 200 in the first direction (X-direction), and the fourth ball member B4 may guide movement of the lens module 200 in the second direction (Y-direction).

For example, the third ball member B3 may roll in the first direction (X-direction), when driving force is generated in the first direction (X-direction). Therefore, the third ball member B3 may guide movement of the guide frame 300 and the lens module 200 in the first direction (X-direction).

The fourth ball member B4 may roll in the second direction (Y-direction), when driving force is generated in the second direction (Y-direction). Therefore, the fourth ball member B4 may guide movement of the lens module 200 in the second direction (Y-direction).

The third ball member B3 may include a plurality of ball members disposed between the carrier 400 and the guide frame 300, and the fourth ball member B4 may include a plurality of ball members disposed between the guide frame 300 and the lens module 200.

For example, referring to FIG. 2, the third ball member B3 and the fourth ball member B4 may include four ball members, respectively.

A third guide groove portion G3 for accommodating the third ball member B3 may be formed on at least one of surfaces on which the carrier 400 and the guide frame 300 face each other in the optical axis (Z-axis) direction. The third guide groove portion G3 may include a plurality of guide grooves corresponding to the plurality of ball members of the third ball member B3.

The third ball member B3 may be accommodated in the third guide groove portion G3, and may be inserted between the carrier 400 and the guide frame 300.

The third ball member B3 may limit movement in the optical axis (Z-axis) direction and movement in the second direction (Y-direction), and may move only in the first direction (X-direction), in a state accommodated in the third guide groove portion G3. For example, the third ball member B3 may roll only in the first direction (X-direction).

To this end, a planar shape of each of the plurality of guide groove portions of the third guide groove portion G3 may have a rectangular shape having a length in the first direction (X-direction).

Also, the second magnet 611 may be disposed on a side surface of the lens holder 230. For example, when viewed in the optical axis (Z-axis) direction, the second magnet 611 may be disposed not to overlap a virtual line A2 interconnecting the plurality of guide groove portions of the third guide groove portion G3. For example, the second magnet 611 may be disposed outside the virtual line A2 interconnecting the plurality of guide groove portions of the third guide groove portion G3.

A fourth guide groove portion G4 for accommodating the fourth ball member B4 may be formed on at least one of surfaces on which the guide frame 300 and the lens module 200 (e.g., the lens holder 230) face each other in the optical axis (Z-axis) direction. The fourth guide groove portion G4 may include a plurality of guide grooves corresponding to the plurality of ball members of the fourth ball member B4.

The fourth ball member B4 may be accommodated in the fourth guide groove portion G4, and may be inserted between the guide frame 300 and the lens module 200.

The fourth ball member B4 may limit movement in the optical axis (Z-axis) direction and movement in the first direction (X-direction), and may move only in the second direction (Y-direction), in a state accommodated in the fourth guide groove portion G4. For example, the fourth ball member B4 may roll only in the second direction (Y-direction).

To this end, a planar shape of each of the plurality of guide groove portions of the fourth guide groove portion G4 may have a rectangular shape having a length in the second direction (Y-direction).

Also, the third magnet 631 may be disposed on a side surface of the lens holder 230. For example, the third magnet 631 may be disposed between a plurality of guide grooves of the fourth guide groove portion G4. For example, when viewed in the optical axis (Z-axis) direction, the third magnet 631 may be disposed to overlap a virtual line A1 interconnecting the plurality of guide groove portions of the fourth guide groove portion G4.

Figure 9:
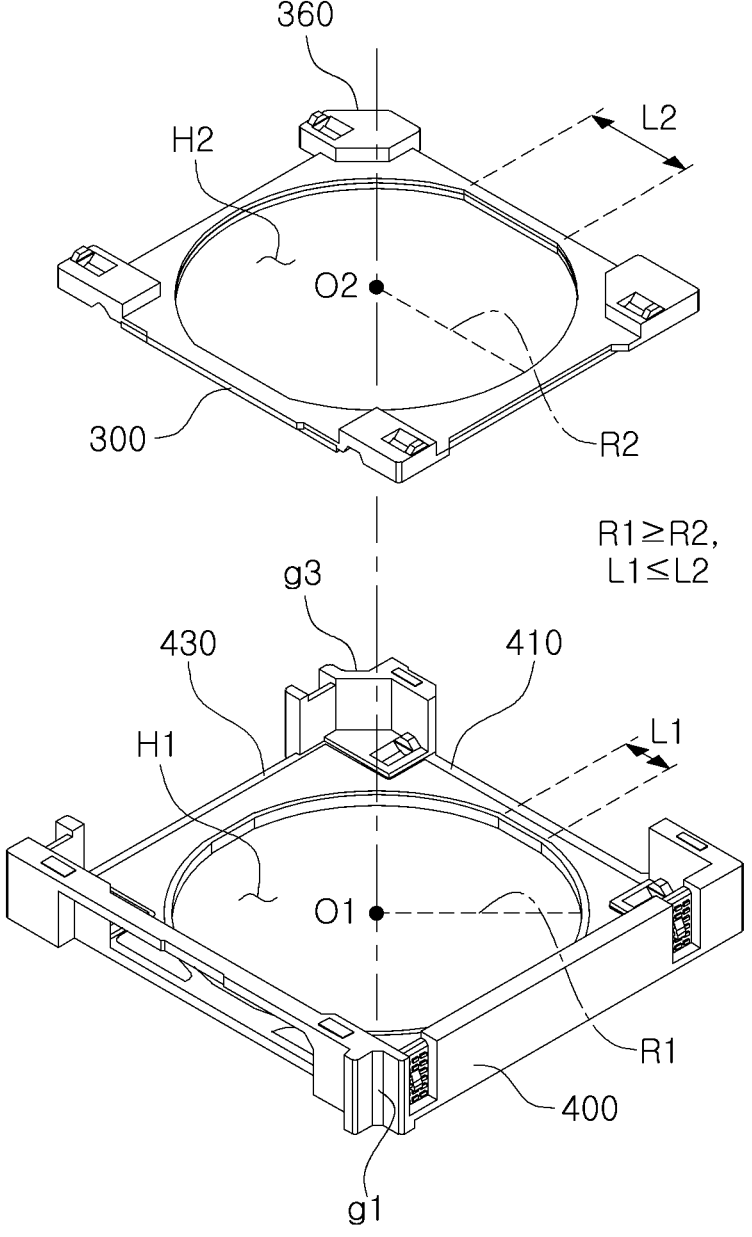
FIG. 9 is an exploded perspective view of a guide frame and a carrier in a camera module according to an embodiment of the present disclosure.
Figure 10:
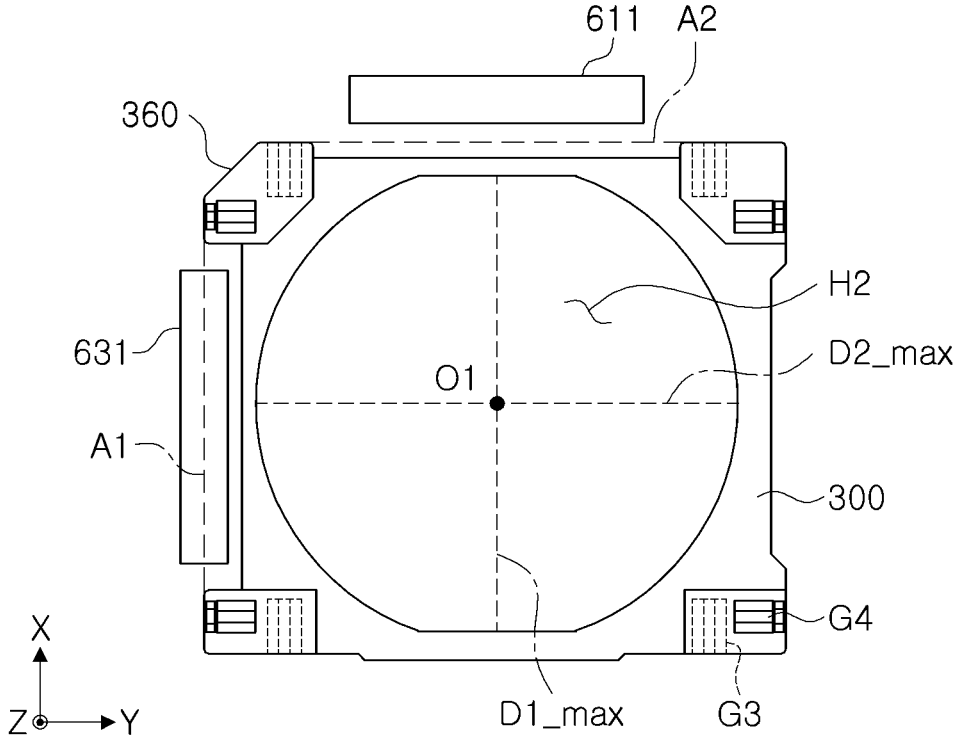
FIG. 10 is a plan view of a guide frame.

FIG. 9 is an exploded perspective view of a guide frame and a carrier in a camera module according to an embodiment of the present disclosure, and FIG. 10 is a plan view of a guide frame.

In an embodiment, a third guide groove portion G3 in which a third ball member B3 is disposed may be formed on a lower surface of a guide frame 300 facing a carrier 400 in the optical axis (Z-axis) direction. In addition, a fourth guide groove portion G4 in which a fourth ball member B4 is disposed may be formed on an upper surface of the guide frame 300 facing a lens module 200 in the optical axis (Z-axis) direction.

The third guide groove portion G3 and the fourth guide groove portion G4 may be disposed in a position that does not overlap each other, when viewed in the optical axis (Z-axis) direction.

Since the third ball member B3 and the fourth ball member B4 may be accommodated in the third guide groove portion G3 and the fourth guide groove portion G4, the third guide groove portion G3 and the fourth guide groove portion G4 should have a predetermined depth, respectively. Therefore, when the third guide groove portion G3 and the fourth guide groove portion G4 overlap each other in the optical axis (Z-axis) direction, the guide frame 300 should be formed to be thick in the optical axis (Z-axis) direction. Due to this, there may be a problem in that a height of a camera module 1 in the optical axis (Z-axis) direction increases.

A camera module 1 according to an embodiment of the present disclosure may arrange the third guide groove portion G3 and the fourth guide groove portion G4 in the optical axis (Z-axis) direction not to overlap each other, such that the guide frame 300 may be formed to be relatively thin, and accordingly, a height of the camera module 1 in the optical axis (Z-axis) direction may be reduced.

In an embodiment, the third guide groove portion G3 and the fourth guide groove portion G4 may be disposed in a position that does not overlap in the first direction (X-direction). In addition, the third guide groove portion G3 and the fourth guide groove portion G4 may partially overlap each other in the second direction (Y-direction), and remaining portions thereof may not overlap in the second direction (Y).

One of the four corners of the guide frame 300 may have a chamfered shape. For example, a corner of the guide frame 300 adjacent to a corner of the carrier 400 in which a second ball member B2 is disposed may have a chamfered shape.

When driving force is generated in the first direction (X-direction), the guide frame 300 and the lens module 200 may move together in the first direction (X-direction).

In this case, the third ball member B3 may roll in the first direction (X-direction). In this case, movement of the fourth ball member B4 may be limited.

In addition, when driving force is generated in the second direction (Y-direction), the lens module 200 may move relative to the guide frame 300 in the second direction (Y-direction).

In this case, the fourth ball member B4 may roll in the second direction (Y-direction). In this case, movement of the third ball member B3 may be limited.

In an embodiment, the camera module 1 may detect a position of the lens module 200 in a direction, perpendicular to the optical axis (Z-axis).

To this end, a second position sensor 615 and a third position sensor 635 may be provided. The second position sensor 615 may be disposed on a substrate 700 to face a second magnet 611, and the third position sensor 635 may be disposed on the substrate 700 to face a third magnet 631. The second position sensor 615 and the third position sensor 635 may be hall sensors.

At least one of the second position sensor 615 or the third position sensor 635 may include two hall sensors. For example, the second position sensor 615 may include the two hall sensors disposed to face the second magnet 611.

It is possible to detect whether the lens module 200 rotates through the two hall sensors facing the second magnet 611. Since the second coil 613 may include two coils facing the second magnet 611, rotational force applied to the lens module 200 may be canceled by controlling the second coil 613.

Rotation of the lens module 200 may be prevented by configuration of the third and fourth guide groove portions G3 and G4 in which the third ball member B3 and the fourth ball member B4 are disposed, but the lens module 200 may finely rotate due to influence of tolerances occurring in a manufacturing process of mechanism.

In a camera module 1 according to an embodiment of the present disclosure, it is possible to determine whether the lens module 200 rotates by the second coil 613 and the second position sensor 615, and to cancel rotational force resulted therefrom.

In the present disclosure, the carrier 400 and the guide frame 300 may maintain contact with the third ball member B3, and a second yoke 410 and a third yoke 430 may be provided to maintain contact of the guide frame 300 and the lens module 200 with the fourth ball member B4.

The second yoke 410 and the third yoke 430 may be fixed to the carrier 400, and may be arranged to face the second magnet 611 and the third magnet 631 in the optical axis (Z-axis) direction.

Therefore, attractive force may be generated between the second yoke 410 and the second magnet 611 and between the third yoke 430 and the third magnet 631 in the optical axis (Z-axis) direction, respectively.

Since the lens module 200 and the guide frame 300 may be pressed in a direction toward the second yoke 410 and the third yoke 430 by the attractive force between the second yoke 410 and the second magnet 611 and the attractive force between the third yoke 430 and the third magnet 631, the guide frame 300 and the lens module 200 may maintain contact with the third ball member B3 and the fourth ball member B4.

The second yoke 410 and the third yoke 430 may be materials capable of generating attractive force between the second magnet 611 and the third magnet 631. For example, the second yoke 410 and the third yoke 430 may be a magnetic material.

The stopper 250 may be coupled to the carrier 400 to cover at least a portion of an upper surface of the lens module 200. For example, the stopper 250 may cover at least a portion of an upper surface of the lens holder 230.

When viewed in the optical axis direction, the stopper 250 may cover both the second magnet 611 and the third magnet 631 (see FIGS. 2 and 3).

The stopper 250 may prevent the guide frame 300 and the lens module 200 from being separated from the carrier 400 due to an external shock or the like.

A camera module according to an embodiment of the present disclosure may improve focus adjustment performance and a shake correction function.

While specific examples have been shown and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module comprising:
a housing having an internal space;
a carrier disposed in the internal space;
a lens module disposed in the carrier; and
a first ball member and a second ball member disposed between the carrier and the housing and spaced apart from each other in a direction perpendicular to an optical axis,
wherein a virtual line connecting a center of a ball included in the first ball member and a center of a ball included in the second ball member passes through the lens module, and
the lens module comprises a first avoidance portion comprising a space in which the first ball member or the second ball member is disposed.

2. The camera module of claim 1, wherein the first ball member and the second ball member are disposed at opposite corners of the carrier so that the first ball member and the second ball member are spaced apart from each in a diagonal direction of the carrier.

3. The camera module of claim 2, further comprising a guide frame disposed between the carrier and the lens module in an optical axis direction,
wherein the first avoidance portion is disposed at any one corner of the lens module, and
the guide frame comprises a second avoidance portion overlapping the first avoidance portion in the optical axis direction.

4. The camera module of claim 1, wherein the first avoidance portion has a cut shape disposed at a position overlapping the first ball member or the second ball member in an optical axis direction.

5. The camera module of claim 3, wherein the lens module comprises a lens barrel comprising at least one lens disposed therein, and a lens holder coupled to the lens barrel, and
the lens holder comprises the first avoidance portion.

6. The camera module of claim 1, further comprising a guide frame disposed between the carrier and the lens module in an optical axis direction,
wherein the guide frame comprises a second avoidance portion disposed at a position overlapping the first avoidance portion in the optical axis direction.

7. The camera module of claim 6, wherein the first avoidance portion and the second avoidance portion form respective spaces overlapping each other in the optical axis direction, and
the first ball member or the second ball member is disposed in the spaces formed by the first avoidance portion and the second avoidance portion.

8. The camera module of claim 6, wherein the first avoidance portion has a shape in which a corner of the lens holder is cut, and
the second avoidance portion has a shape in which a corner of the guide frame is cut.

9. The camera module of claim 1, wherein, in a state in which the lens module is disposed in the carrier, either one or both of the first ball member and the second ball member is exposed to be upwardly visible in an optical axis direction.

10. The camera module of claim 1, wherein the first ball member and the second ball member are disposed in respective guide groove portions formed on an external surface of the carrier.

11. The camera module of claim 10, wherein the first avoidance portion is disposed at a position corresponding to a position at which one of the guide groove portions is formed on the external surface of the carrier.

12. An electronic device comprising:
the camera module of claim 1; and
an image sensor configured to convert light incident through the lens module into an electrical signal.

13. A camera module comprising:
a housing having an internal space;
a carrier disposed in the internal space;
a lens holder disposed in the carrier;
a lens barrel coupled to the lens holder; and
a first ball member and a second ball member disposed between the carrier and the housing and spaced apart from each other in a direction perpendicular to an optical axis,
wherein a length of a virtual line connecting a center of a ball included in the first ball member and a center of a ball included in the second ball member is greater than a maximum diameter of the lens barrel, and
at least a portion of the second ball member is disposed in an internal space of a virtual corner formed by a virtual intersection point at which virtual lines extending from two edges of the lens holder adjacent to the second ball member meet.

14. The camera module of claim 13, wherein the virtual corner is a first avoidance portion in which a corner of the lens holder is cut.

15. The camera module of claim 14, further comprising a guide frame disposed between the carrier and the lens holder in an optical axis direction,
wherein the guide frame comprises a second avoidance portion disposed at a position overlapping the first avoidance portion in the optical axis direction.

16. An electronic device comprising:
the camera module of claim 13; and
an image sensor configured to convert light incident through the lens module into an electrical signal.

17. A camera module comprising:
a housing having an internal space;
a carrier disposed in the internal space; and
a lens module disposed in the carrier,
wherein the carrier is configured to move in an optical axis direction on support ball members disposed between the carrier and the housing,
closest support ball members are disposed on a same diagonal of the carrier,
each support ball member comprises one or more balls, and
the lens module comprises a first avoidance portion providing a space in which one of the support ball members is disposed.

18. The camera module of claim 17, wherein the lens module comprises a lens barrel and a lens holder, and
the support ball members comprise a first ball member and a second ball member disposed on opposite sides of the lens barrel from each other.

19. The camera module of claim 18, further comprising a magnet disposed on one of the carrier and the housing, and a coil disposed on another one of the carrier and the housing, the magnet and the coil being configured to drive the carrier in the optical axis direction,
wherein the first ball member is disposed closer to the magnet than the second ball member.

20. An electronic device comprising:

the camera module of claim 17; and an image sensor configured to convert light incident through the lens module into an electrical signal.

* * * * *